United States Patent
Gilad et al.

(10) Patent No.: US 9,900,775 B2
(45) Date of Patent: Feb. 20, 2018

(54) ON-DEVICE AUTHORIZATION OF DEVICES FOR COLLABORATION AND ASSOCIATION

(71) Applicant: International Business Machines Corporation, Armonk, NY (US)

(72) Inventors: Yossi Gilad, Tel-Aviv (IL); Ayman Jarrous, Tel-Aviv (IL); Ravid Sagy, Tel Aviv (IL); Alexandra Shulman-Peleg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/843,239

(22) Filed: Sep. 2, 2015

(65) Prior Publication Data

US 2017/0064556 A1 Mar. 2, 2017

(51) Int. Cl.
*H04W 12/08* (2009.01)
*H04L 29/06* (2006.01)
*H04W 4/00* (2009.01)
*H04W 48/08* (2009.01)

(52) U.S. Cl.
CPC .......... *H04W 12/08* (2013.01); *H04L 63/102* (2013.01); *H04W 4/005* (2013.01); *H04W 48/08* (2013.01)

(58) Field of Classification Search
CPC .............................. H04W 12/06; H04L 42/70
USPC ........................................................ 455/411
See application file for complete search history.

(56) References Cited

U.S. PATENT DOCUMENTS

| | | | |
|---|---|---|---|
| 8,418,238 B2 | 4/2013 | Platt et al. | |
| 8,474,018 B2 | 6/2013 | Mardikar et al. | |
| 8,547,910 B2 | 10/2013 | Chakrabarti et al. | |
| 8,595,788 B2 | 11/2013 | Lim | |
| 2012/0216247 A1 | 8/2012 | Gross et al. | |
| 2013/0246470 A1 | 9/2013 | Price et al. | |
| 2014/0126581 A1* | 5/2014 | Wang | H04W 4/001 370/431 |
| 2014/0324973 A1* | 10/2014 | Goel | H04L 12/2803 709/204 |
| 2014/0359061 A1* | 12/2014 | Foti | H04L 67/10 709/217 |

(Continued)

FOREIGN PATENT DOCUMENTS

WO 2015052483 A1 4/2015

OTHER PUBLICATIONS

Formisano, C. et al., Cloud Access Control Mechanisms (2013). Book chapter in "Data Intensive Storage Services for Cloud Environments," by IGI Global, pp. 94-108.

(Continued)

*Primary Examiner* — Muthuswamy Manoharan
(74) *Attorney, Agent, or Firm* — Terrile, Cannatti, Chambers & Holland, LLP; Stephen A. Terrile (57) ABSTRACT

A method, system and computer-usable medium for performing an authorization operation on an Internet of Things (IoT) type device, comprising: providing each of a plurality of IoT type devices with a respective authorization system; receiving a request to share resources at one of the plurality of IoT type devices; determining via the respective authorization system whether the one of the plurality of IoT devices has an IoT resource available for sharing; and, enabling sharing of the IoT resource when the respective authorization system determines that the IoT resource is available for sharing.

14 Claims, 3 Drawing Sheets

(56) References Cited

U.S. PATENT DOCUMENTS

2015/0055640 A1* 2/2015 Wang .................... H04W 4/005
                                                    370/338
2015/0121470 A1    4/2015 Rongo et al.
2015/0256337 A1* 9/2015 Nguyen ................ H04L 9/0841
                                                    713/171

OTHER PUBLICATIONS

Harnik, D. et al., Secure Access Mechanism for Cloud Storage, Scalable Computing: Practice and Experience 12(3), pp. 317-336, 2011 http://www.scpe.org/index.php/scpe/article/view/727.
Demchanko, Yuri et al., Policy Based Access Control in Dynamic Grid -based Collaborative Environment. CTS, p. 64-73, IEEE Computer Society, (2006) http://www.uazone.org/demch/presentations/cts2006-ydemchenko-pbac-dynamic01.pdf.
Ruj, Sushmita et al., DACC: Distributed Access Control in Clouds, 2011 International Joint Conference of IEEE TrustCom-11/IEEE ICESS-11/FCST-11.

* cited by examiner

ON-DEVICE AUTHORIZATION OF DEVICES FOR COLLABORATION AND ASSOCIATION

BACKGROUND OF THE INVENTION

Field of the Invention

The present invention relates in general to the field of computers and similar technologies, and in particular to software utilized in this field. Still more particularly, it relates to a method, system and computer-usable medium for on-device authorization of devices for collaboration and association.

Description of the Related Art

It is known to communicate with and control many devices via the Internet. This communication and control is often referred to as the Internet of Things (IoT) and the devices are referred to as IoT devices. The IoT allows devices to be sensed and controlled remotely across existing network infrastructure. IoT devices often have limited resources (e.g. battery power, transmission distance, storage area). Often to fulfill a task, some IoT devices may need to use the resources of other IoT devices. However, known authorization models may be insufficient to address emerging IoT requirements. For example, role-attribute based access control models (RBAC/ABAC) can separate the access decision from the point of use, introducing additional performance overhead which can be unacceptable in the case of limited IoT devices. Also for example, access control lists (ACLs) define the users authorized to access the resource along with their access rights. The ACLs efficiently remove the performance overhead of RBAC/ABAC by moving the access decision point to be close to the point of use. However, known ACLs models do not provide the capability to manage association and collaboration between IoT devices.

SUMMARY OF THE INVENTION

A method, system and computer-usable medium are disclosed for performing an authorization operation on an Internet of Things (IoT) type device, comprising: providing each of a plurality of IoT type devices with a respective authorization system; receiving a request to share resources at one of the plurality of IoT type devices; determining via the respective authorization system whether the one of the plurality of IoT devices has an IoT resource available for sharing; and, enabling sharing of the IoT resource when the respective authorization system determines that the IoT resource is available for sharing.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for performing an authorization operation on IoT type devices. More specifically, in certain embodiments, each IoT device includes an authorization system which allows sharing of limited resources between different IoT devices to increase the overall performance of a system of IoT devices. In various embodiments, the authorization system includes an access enforcer module and an access control list module. In various embodiments, the access control list module includes information regarding IoT device resources as well as information regarding neighboring IoT devices.

In various embodiments, the access control list module includes access control lists which include rules for IoT resource sharing conditions. The IoT resource sharing conditions can include a description of a time period during which sharing is permitted as well as circumstances under which the resources may be shared (e.g. share the battery until time/date=XX with IoT=Y for operation=J).

In various embodiments, the access enforcer module evaluates the ACLs and either denies or allows a sharing operation. More specifically, when an IoT device receives a request to access its resources, the access enforcer module of the IoT device makes the authorization and the resources sharing decisions. In various embodiments, the access enforcer module performs one or more of a plurality of enforcement operations. More specifically, the enforcement operations include determining whether the ACLs of the IoT device indicates that the operation allowed and whether the IoT device has enough resources to perform the operation. If so, then the access enforcer module allows the IoT resource to be shared with another IoT device. If a trusted neighboring IoT device has enough resources, then the access enforcer module forwards the request to the trusted neighboring IoT device. Additionally, in certain embodiments, the request may be escalated to an IoT cluster manager, which decides if and who should share its resources with the requester. In various embodiments, the system allows sharing limited IoT resources such as battery power, transmission distance, storage area, etc.

Once the access allowed, the access enforcer controls the request execution by ensuring that the resource sharing conditions are maintained. If the resource sharing conditions expire (e.g. the time period ended) the operation is interrupted and the sharing operation is ended.

In many cases, IoT devices are designed with a bus having a narrow communication width (e.g., with 8-bit buses). This narrow communication width is often insufficient for many important computations (such as encryption methods based on 32 bit operations). Accordingly, the authorization operation can be applied to enable distribution of such computations among the different IoT devices. With such an authorization operation, the computation is divided among different IoT devices and the authorization gateway, and the dynamic ACLs control the access to the partial results of the computations.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
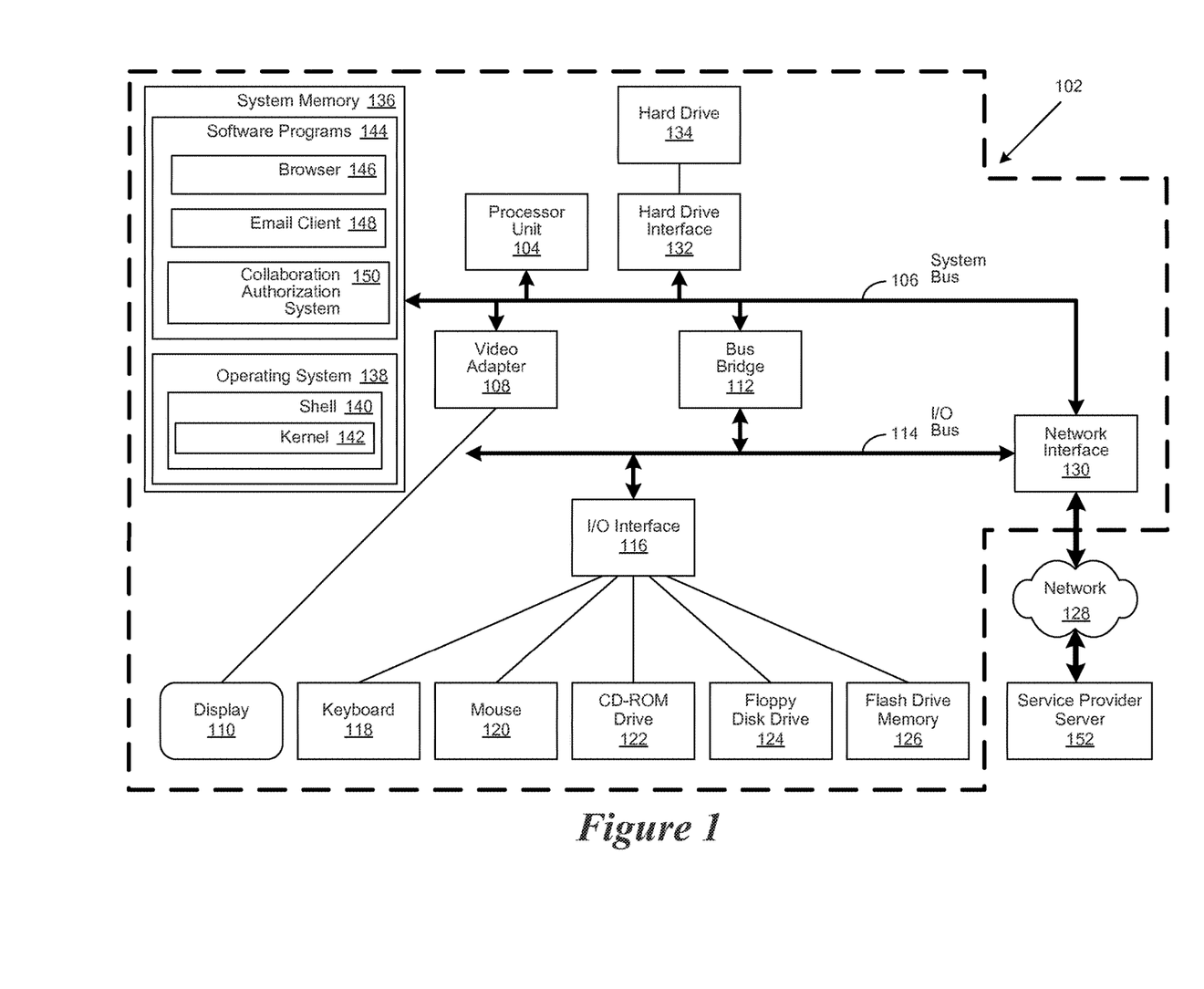
FIG. 1 depicts an exemplary client computer in which the present invention may be implemented.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using Hyper-Text Transfer Protocol (HTTP) messaging, thus enabling communication with service provider server 152. In various embodiments, software programs 144 may also include a collaboration authorization module 150. In these and other embodiments, the collaboration authorization module 150 includes code for implementing the processes described herein below. In one embodiment, client computer 102 is able to download the collaboration authorization module 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
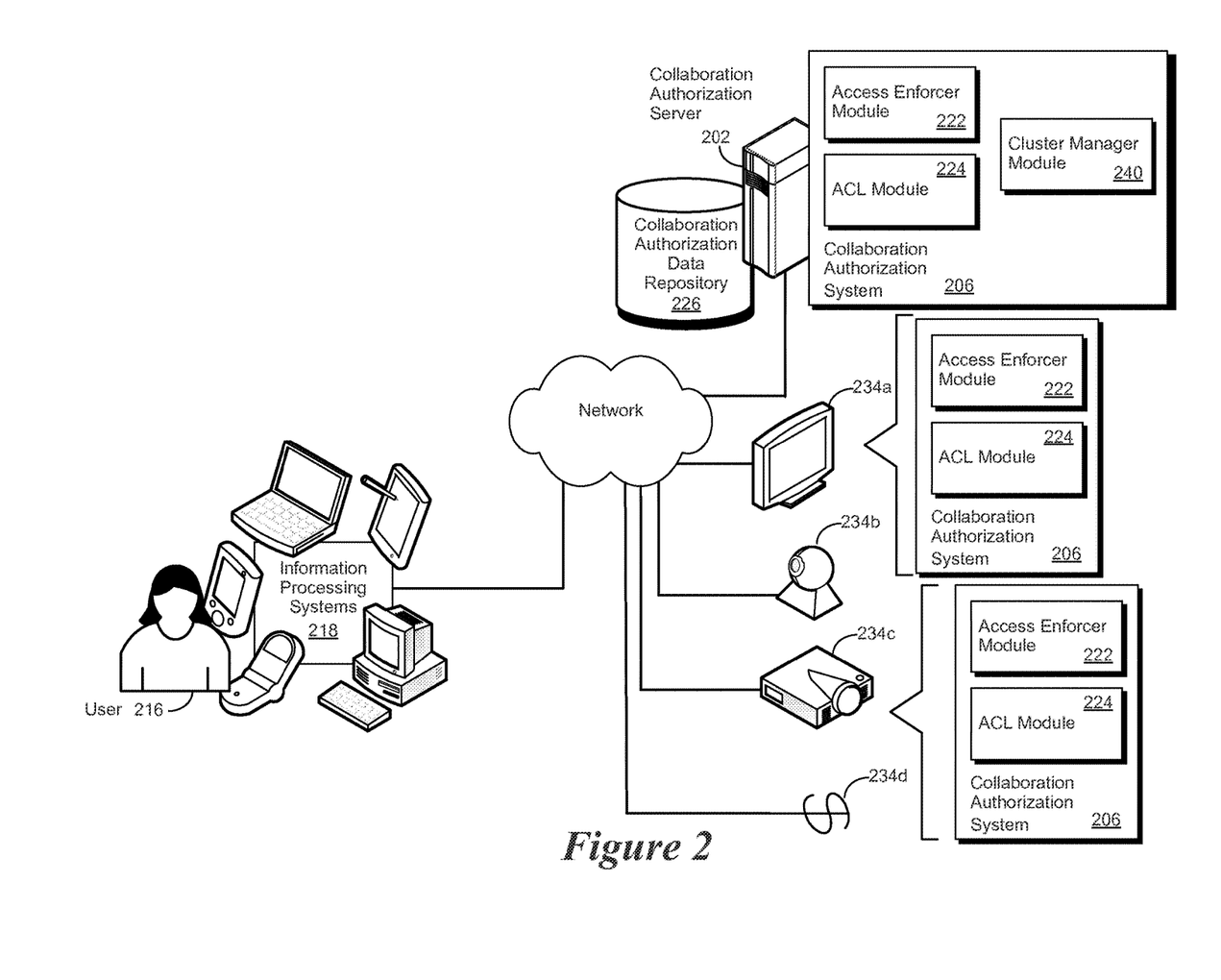
FIG. 2 is a simplified block diagram of an information processing environment having many IoT type devices.

Referring to FIG. 2, a simplified block diagram of an information processing environment 200 having many IoT type devices is shown.

The environment 200 includes a collaboration authorization server 202 which includes a collaboration authorization system 206. In certain embodiments, the collaboration authorization system 206 comprises some or all of the collaboration authorization module 150. In certain of these embodiments, the collaboration authorization system 206 comprises an access enforcer module 222 and an ACL module 224. In these and other embodiments, a user 216 may use an information processing system 218 to access one or more collaboration authorization systems 206. As used herein, an information processing system 218 may comprise a personal computer, a laptop computer, or a tablet computer operable to exchange data between the user 216 and the collaboration authorization server 202 over a connection to network 140. The information processing system 218 may also comprise a personal digital assistant (PDA), a mobile telephone, or any other suitable device operable to display a user interface (UI) 220 and likewise operable to establish a connection with network 140. In various embodiments, the information processing system 218 is likewise operable to establish a session over the network 140 with the collaboration authorization system 206.

In various embodiments, collaboration authorization operations are performed by the collaboration authorization system 206 to control collaboration among devices (such as device 234) which may not include integrated authorization systems. Additionally and alternatively, collaboration authorization operations may be performed among devices (such as device 234a, 234c) which include their own respective collaboration authorization system 206.

The collaboration authorization systems 206 enable the environment 200 to perform authorization operation on IoT type devices. More specifically, in certain embodiments, some or all of the IoT devices 234 include an authorization system which allows sharing of limited resources between different IoT devices to increase the overall performance of a system of IoT devices. In various embodiments, the authorization system 206 includes an access enforcer module 222 and an access control list module 224. In various embodiments, the access control list module 224 includes information regarding IoT device resources as well as information regarding neighboring IoT devices.

In various embodiments, the access control list module 224 includes access control lists which include rules for IoT resource sharing conditions. The IoT resource sharing conditions can include a description of a time period during which sharing is permitted as well as circumstances under which the resources may be shared (e.g. share the battery until time/date=XX with IoT=Y for operation=J).

In various embodiments, the access enforcer module 222 evaluates the ACLs and either denies or allows a sharing operation. More specifically, when an IoT device 234 receives a request to access its resources, the access enforcer module 222 of the IoT device makes the authorization and the resources sharing decisions. In various embodiments, the access enforcer module 222 performs one or more of a plurality of enforcement operations. More specifically, the enforcement operations include determining whether the ACLs of the IoT device 234 indicates that the operation allowed and whether the IoT device 234 has enough resources to perform the operation. If so, then the access enforcer module 224 allows the IoT resource to be shared with another IoT device. If a neighboring device (i.e., a device that can be reached via short-range communication means) has enough resources and is trusted to relay messages (i.e., the device will not modify, discard, delay or otherwise manipulate relayed communication), then the access enforcer module forwards the request to the trusted neighboring IoT device 234. Additionally, in certain embodiments, the request may be escalated to an IoT cluster manager 240, which decides if and who should share its resources with the requester. In various embodiments, the cluster manager is included within the server version of the collaboration authorization system 206. In other embodiments, a cluster manager 240 is associated with a predetermined cluster of IoT type devices. In various embodiments, the system allows sharing limited IoT resources such as battery power, transmission distance, storage area, etc.

Once the access allowed, the access enforcer module 222 controls the request execution by ensuring that the resource sharing conditions are maintained. If the resource sharing conditions expire (e.g. the time period ended) the operation is interrupted and the sharing operation is ended.

In many cases, IoT devices are designed with a relatively narrow bus communication width (e.g., with 8-bit buses). This narrow bus communication width is often insufficient for many important computations (such as encryption methods based on 32 bit operations). Accordingly, the authorization operation can be applied to enable distribution of such computations among the different IoT devices. With such an authorization operation, the computation is divided among different IoT devices and the authorization gateway, and the dynamic ACLs control the access to the partial results of the computations.

Figure 3:
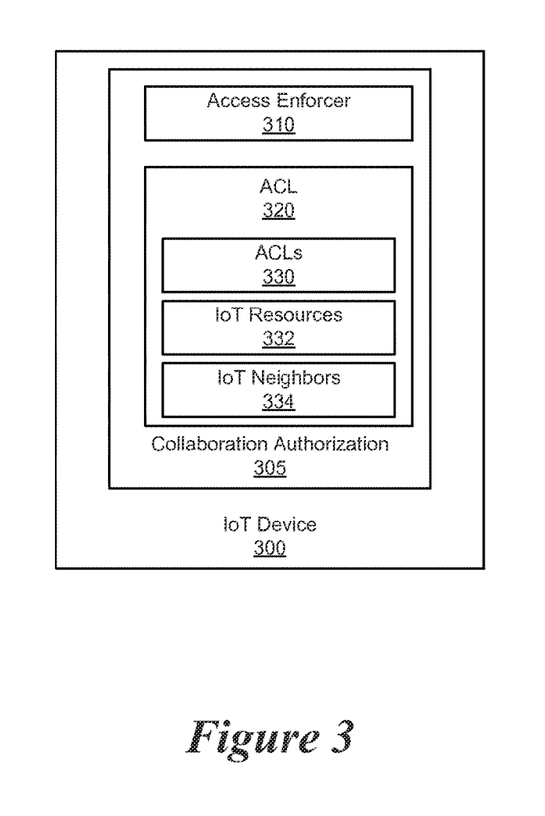
FIG. 3 is a generalized block diagram of an IoT type device.

Referring to FIG. 3, a block diagram of an IoT device 300 having a collaboration authorization system 305 is shown. With IoT devices, it can be desirable to enable external entities (e.g. other IoT devices) to access services and/or use resources within an IoT device. For example, when performing encryption operations, some of the encryption methods require 32 bit operations (e.g. Advanced Encryption Standard (AES) encryption) that can't be efficiently performed by typical IoT device processors (which are often 8-bit processor) in a reasonable amount of time.

However, it is desirable to control the access to an IoT device and allow only devices and/or users with the proper privilege to carry out operations. Accordingly, the IoT device 300 is provided with a collaboration authorization system 305. The collaboration authorization system 305 includes an access enforcer component 310 and an ACL component 320. The ACL component 320 includes an ACL portion 330, an IoT Resource portion 332 and an IoT Neighbor portion 334. The collaboration authorization system 205 performs an authentication operation which determines and verifies the identity of a device or a user in the system and an authorization operation which determines the access rights of a user to a device or users specific resource.

With the ACL portion 330, strings describing the access permissions are stored as attributes of the IoT resource that they control. In one embodiment, the strings are stored in a supplementary cache/key-value store, in which the IoT resource is identified by a unique descriptor (e.g. UUID). For example in certain embodiments, the syntax of an ACL entry can be as follows: <user:group><operation>, where the <user:group> may be <IoT device identifier: IoT device group> and operation may be <operation: power consumption, length: 1 hour, condition: full battery>, or <operation: transmission, length: 1 h, condition: 1 Mb>. In the first case, this means that the battery of the IoT device 300 can be shared for 1 hour under the condition that the battery is over a predefined threshold (e.g. 80% full). In the second case, this allows network transmission of up to 1 hour under the condition that the transmission does not exceed 1 Mb.

The access enforcer component 310 performs an access enforcement operation which controls access to the resources by retrieving and evaluating the ACLs from the ACL portion. It includes two interrelated functionalities. More specifically, the access enforcer component 310 performs access control decisions where upon receiving a request to access a certain resource the access enforcer component 310 evaluates the ACLs from the ACL portion 320, the IoT status and the environment conditions and either allows or denies access. Additionally, the access enforcer component 310 performs a flow control function where the access enforcer component 310 controls the flow and the operations performed over the shared resources, ensuring that the conditions under which the access was granted and the resource was shared still hold. E.g., that an IoT device allows one of its neighbors to use its transmission capability for 1 Hour and to transmit a maximum of 1 MB. In certain embodiments, an access enforcement operation is combined with a rate limit algorithm, such as a token bucket or leaky bucket type operation thereby allowing the access enforcer component 310 to control the traffic and stop the sharing (i.e. removing the grant) once the operation (e.g. transmission) is finished.

In various embodiments, the IoT device 300 can provide one or more shared resources. For example, the shared resources can include battery resources, transmission resources, storage resources as well as the ACLs that control access to them. Each shared resource can be in one of a plurality of states. More specifically in various embodiments, the resource may include an allocated state, a reuse state, and an invalid state. With the allocated state, the resource may be presently allocated and thus can be limited in size in time. With the reuse state, the resource is allowed to be reused where an allocated time for sharing has expired and the resource can be re-used. With an invalid state, the resource has been de-allocated and may not presently be used as a shared resource. The access enforcer component 310 controls the sharing process and the transition from state to state.

Figure 4:
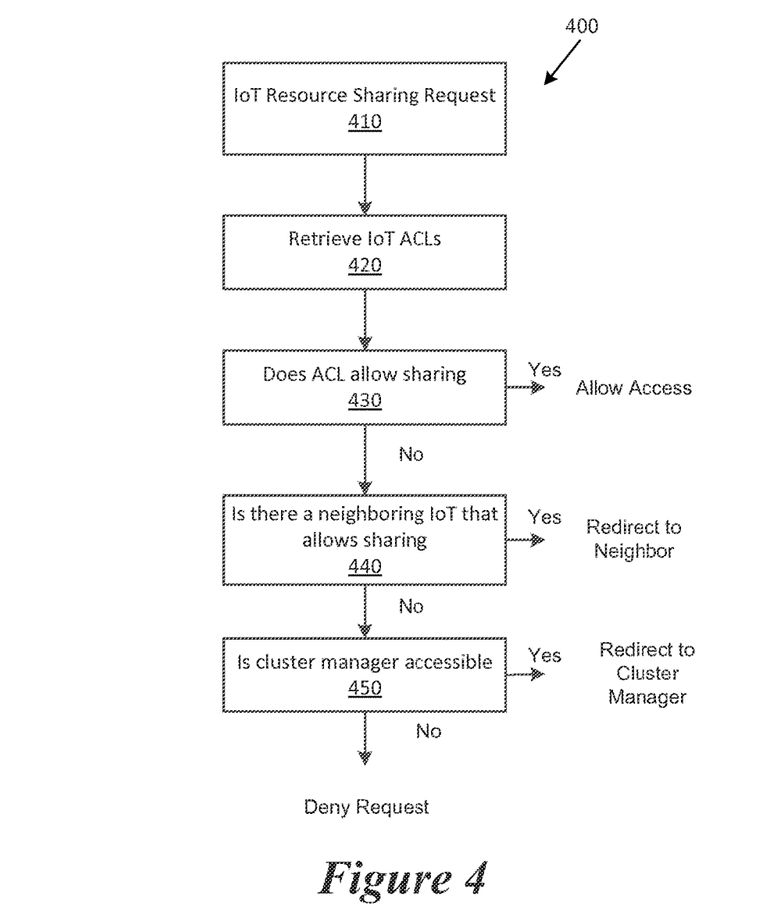
FIG. 4 shows a flow chart of an on-device authorization operation.

Referring to FIG. 4, a flow chart of the operation of a collaboration authorization operation 400 is shown. More specifically, the collaboration operation begins at step 410 with an IoT device receiving an IoT resource sharing request. Next at step 420, the access enforcer component 310 retrieves ACLs for the IoT device receiving the request (e.g., IoT A). Next, at step 430, the access enforcer component 310 determines whether the ACLs of the IoT device all the IoT device to share its resources. If so, then the access enforcer component allows sharing of the resources of the IoT device (e.g., IoT A). If not, then the access enforcer reviews the information regarding neighbors (e.g., from the IoT Neighbor portion 334) of the IoT device at step 440. If there are any neighboring IoT devices (e.g., IoT N) which allow sharing of resources, then the access enforcer component 310 redirects the sharing request to the neighboring IoT device. If not, then the access enforcer component 310 determines whether there is a cluster manager accessible to which a request to forward of the sharing request may be provided at step 450 If so, then the sharing request is redirected to the cluster manager. If not, then the access enforcer component denies the sharing request.

In certain embodiments, the IoT devices are associated via and IoT association operation. In an IoT environment (e.g., environment 200), IoT devices (e.g., IoT devices 234) are coupled via a cluster manager (e.g., cluster manager module 240). The cluster manager may be coupled across a subset of IoT devices before the devices are coupled to a network such as the Internet or may communicate with certain IoT devices via the network. To request access for a resource from its neighbors, the IoT device first retrieves the list of trusted neighbors from the cluster manager. When the IoT wishes to collaborate or to obtain a resource from one of its neighbors, the IoT device sends a request to one or more devices on the list. In some cases the request can be also broadcast to all the neighbors identified within the neighbors list (e.g., within the neighbor portion 334. In other cases the request may be sent or broadcast to all nearby devices (without retrieving a neighbors list from the cluster manager). When a neighboring IoT device decides to share a resource and allow access, the neighboring IoT device allocates the resource and notifies the requester. The requesting IoT then acknowledges the approval and begins using the resource. If the requester does not respond to the access approval message, the request expires and the resource is released.

In certain embodiments, the IoT devices may perform an IoT collaboration operation. The collaboration authorization system 305 can control collaboration and association between IoT devices.

Such collaboration may be desirable for devices that cannot execute certain tasks on their own and need the help of the neighboring IoT devices (which may have additional or more powerful resources available), and/or which have more advanced hardware/software characteristics (e.g., processor cycles, data bus length, memory size, etc.) For example, the modern encryption methods use extensive processor computations, which are usually based on 128 bits or more. Some IoT devices us 8-bits processor/micro controllers which often can't perform desired encryption operations. For example, if a first IoT device (IoT_A) does not have enough processor power/data bus size, the first IoT device can collaborate with other IoT devices to perform the desired calculations.

For example, to perform AES-CTR symmetric encryption calculations (with a 128 bit key and 128 bit random initiation vector), the IoT can collaborate with at least two other IoT devices. In this collaboration operation, a first IoT device (IoT_B) which has enough entropy is requested to generate a pseudo random vector. The second IoT device (IoT_C), which has enough computation capabilities, receives the random vector and the text to be encrypted. The returned encryption results can now be safely sent by the IoT to external sources. The described authorization methodology allows exporting the computations to the trusted IoT neighbors who are able to share their resources for this task. With this collaroration operation, the ACLs stored on the neighboring IoT devices may be set forth as: on IoT_B <IoT_A: G><can generate a random seed>, on IoT_C <IoT_A: G><can perform encryption operations>.

The list of trusted neighbors stored on IoT_A and management device will include [IoT_B, IoT_C, . . . ].

Although the present invention has been described in detail, it should be understood that various changes, substitutions and alterations can be made hereto without departing from the spirit and scope of the invention as defined by the appended claims.

What is claimed is:

1. A computer-implemented method for performing an authorization operation on an Internet of Things (IoT) type device, comprising:
providing some of a plurality of IoT type devices with a respective authorization system;
providing another plurality of IoT type devices, the another plurality of IoT type devices not having respective authorization systems;
providing a collaboration authorization system executing on a collaboration authorization server;
receiving a request to share resources at one of the plurality of IoT type devices;
determining via the respective authorization system and the collaboration authorization system whether the one of the some of the plurality of IoT devices and the another plurality of IoT type devices has an IoT resource available for sharing;
enabling sharing of the IoT resource when the respective authorization system and the collaboration authorization system determine that the IoT resource is available for sharing; and wherein
each respective authorization system and the collaboration authorization system comprise an access enforcer module and an access control list module;
the access control list module includes information regarding at least one of IoT device resources and neighboring IoT devices, the information regarding the at least one of IoT device resources and neighboring IoT devices being stored within an access control list;
the access control list module comprises information regarding rules for IoT resource sharing conditions, the information regarding rules for IoT resource sharing conditions being stored within the access control list; and,
the access enforcer module evaluating the access control list to determine whether to allow or deny a sharing operation.

2. The method of claim 1, wherein:
the enabling sharing of the IoT resources enables an IoT device having a less powerful processor to share resources with other IoT devices to perform operations requiring a more powerful processor.

3. The method of claim 1, wherein:
the IoT resource sharing conditions comprise at least one of a description of a time period during which sharing is permitted and circumstances under which the resources may be shared.

4. The system of claim 1, wherein:
the enabling sharing of the IoT resources enables an IoT device having a less powerful processor to share resources with other IoT devices to perform operations requiring a more powerful processor.

5. The method of claim 1, wherein:
some of the IoT devices comprise a narrow bus communication width;
the authorization operations are applied to enable distribution of computations among the IoT devices having the narrow bus communication width to support computations based on a wider bus width;
the computations are divided among the plurality of IoT devices; and,
the access control lists of the plurality of IoT devices control access to partial results of the computations.

6. A system comprising:
a processor;
a data bus coupled to the processor; and
a computer-usable medium embodying computer program code, the computer-usable medium being coupled to the data bus, the computer program code used for performing an authorization operation on an Internet of Things (IoT) type device and comprising instructions executable by the processor and configured for:
providing some of a plurality of IoT type devices with a respective authorization system;
providing a collaboration authorization system for execution on a collaboration authorization server, the collaboration authorization system being coupled with another plurality of IoT type devices, the another plurality of IoT type devices not having respective authorization systems;
receiving a request to share resources at one of the plurality of IoT type devices;
determining via the respective authorization system and the collaboration authorization system whether the one of the some of the plurality of IoT devices and the another plurality of IoT type devices has an IoT resource available for sharing;
enabling sharing of the IoT resource when the respective authorization system and the collaboration authorization system determine that the IoT resource is available for sharing; and wherein
each respective authorization system and the collaboration authorization system comprise an access enforcer module and an access control list module;
the access control list module includes information regarding at least one of IoT device resources and neighboring IoT devices, the information regarding the at least one of IoT device resources and neighboring IoT devices being stored within an access control list;
the access control list module comprises information regarding rules for IoT resource sharing conditions, the information regarding rules for IoT resource sharing conditions being stored within the access control list; and,
the access enforcer module evaluating the access control list to determine whether to allow or deny a sharing operation.

7. The system of claim 6, wherein:
the IoT resource sharing conditions comprise at least one of a description of a time period during which sharing is permitted and circumstances under which the resources may be shared.

8. The system of claim 6, wherein:
some of the IoT devices comprise a narrow bus communication width;
the authorization operations are applied to enable distribution of computations among the IoT devices having the narrow bus communication width to support computations based on a wider bus width;
the computations are divided among the plurality of IoT devices; and,
the access control lists of the plurality of IoT devices control access to partial results of the computations.

9. A non-transitory, computer-readable storage medium embodying computer program code, the computer program code comprising computer executable instructions configured for:
providing some of a plurality of IoT type devices with a respective authorization system;

providing a collaboration authorization system for execution on a collaboration authorization server, the collaboration authorization system being coupled with another plurality of IoT type devices, the another plurality of IoT type devices not having respective authorization systems;;

receiving a request to share resources at one of the plurality of IoT type devices;

determining via the respective authorization system and the collaboration authorization system whether the one of the some of the plurality of IoT devices and the another plurality of IoT type devices has an IoT resource available for sharing;

enabling sharing of the IoT resource when the respective authorization system and the collaboration authorization system determine that the IoT resource is available for sharing; and wherein each respective authorization system and the collaboration authorization system comprise an access enforcer module and an access control list module;

the access control list module includes information regarding at least one of IoT device resources and neighboring IoT devices, the information regarding the at least one of IoT device resources and neighboring IoT devices being stored within an access control list;

the access control list module comprises information regarding rules for IoT resource sharing conditions, the information regarding rules for IoT resource sharing conditions being stored within the access control list; and, the access enforcer module evaluating the access control list to determine whether to allow or deny a sharing operation.

10. The non-transitory, computer-readable storage medium of claim 9, wherein:
the enabling sharing of the IoT resources enables an IoT device having a less powerful processor to share resources with other IoT devices to perform operations requiring a more powerful processor.

11. The non-transitory, computer-readable storage medium of claim 9, wherein:
the IoT resource sharing conditions comprise at least one of a description of a time period during which sharing is permitted and circumstances under which the resources may be shared.

12. The non-transitory, computer-readable storage medium of claim 9, wherein the computer executable instructions are deployable to a client system from a server system at a remote location.

13. The non-transitory, computer-readable storage medium of claim 9, wherein the computer executable instructions are provided by a service provider to a user on an on-demand basis.

14. The non-transitory, computer-readable storage medium of claim 9, wherein:
some of the IoT devices comprise a narrow bus communication width;
the authorization operations are applied to enable distribution of computations among the IoT devices having the narrow bus communication width to support computations based on a wider bus width;
the computations are divided among the plurality of IoT devices; and,
the access control lists of the plurality of IoT devices control access to partial results of the computations.

* * * * *